(12) United States Patent
Claessens

(10) Patent No.: US 10,574,047 B2
(45) Date of Patent: Feb. 25, 2020

(54) SEALING DEVICE FOR FEEDING THROUGH FILAMENTS

(71) Applicant: COMMSCOPE CONNECTIVITY BELGIUM BVBA, Kessel-Lo (BE)

(72) Inventor: Bart Mattie Claessens, Hasselt (BE)

(73) Assignee: COMMSCOPE CONNECTIVITY BELGIUM BVBA, Kessel-Lo (BE)

( * ) Notice: Subject to any disclaimer, the term of this patent is extended or adjusted under 35 U.S.C. 154(b) by 0 days.

(21) Appl. No.: 16/251,718

(22) Filed: Jan. 18, 2019

(65) Prior Publication Data

US 2019/0165557 A1 May 30, 2019

Related U.S. Application Data

(63) Continuation of application No. 14/128,205, filed as application No. PCT/EP2012/061773 on Jun. 20, 2012, now Pat. No. 10,186,853.

(30) Foreign Application Priority Data

Jun. 20, 2011 (EP) .................................. 11170622

(51) Int. Cl.
*H02G 3/22* (2006.01)
*H02B 1/30* (2006.01)
(Continued)

(52) U.S. Cl.
CPC ............... *H02G 3/22* (2013.01); *H02B 1/305* (2013.01); *H02G 3/088* (2013.01); *H02B 1/28* (2013.01)

(58) Field of Classification Search
CPC ........... H02G 3/22; H02G 3/088; H02B 1/305
See application file for complete search history.

(56) References Cited

U.S. PATENT DOCUMENTS 4,624,514 A   11/1986 Smith
4,884,774 A   12/1989 Rodi et al.
(Continued)

FOREIGN PATENT DOCUMENTS

DE   27 20 936 A1   11/1978
DE   38 32 228 C1   10/1989
(Continued)

OTHER PUBLICATIONS

International Search Report for International Application No. PCT/EP2012/061773 dated Oct. 5, 2012 (3 pages).

*Primary Examiner* — William H. Mayo, III
*Assistant Examiner* — Hiram E Gonzalez
(74) *Attorney, Agent, or Firm* — Merchant & Gould P.C.

(57) ABSTRACT

Sealing device for feeding through at least one filament, the sealing device comprising a housing, having a seal block compartment bounded by a front wall, a back wall, and side walls. The front wall and the back wall each include several correspondingly aligned slots having an open end at an open top face of the seal block compartment. The sealing device additionally comprising a seal block arranged in the seal block compartment. The seal block includes slits being open sided towards the open sided top face of the seal block compartment, each slit being aligned with the correspondingly aligned slots in the front and back walls, so that one can feed through a filament by sliding an intermediate part of the filament from the open end into the slit and the corresponding slots of the front and back wall.

20 Claims, 5 Drawing Sheets

(51) Int. Cl.
*H02G 3/08* (2006.01)
*H02B 1/28* (2006.01)

(56) References Cited

U.S. PATENT DOCUMENTS

| | | | |
|---|---|---|---|
| 4,962,989 | A | 10/1990 | Jung et al. |
| 5,101,079 | A | 3/1992 | Rodrigues et al. |
| 5,535,298 | A | 7/1996 | Fasnacht et al. |
| 6,265,670 | B1 * | 7/2001 | Duesterhoeft ......... H02G 3/083 174/152 G |
| 6,561,466 | B1 * | 5/2003 | Myers .................... F16L 3/221 248/68.1 |
| 6,947,654 | B2 | 9/2005 | Krampotich et al. |
| 7,355,130 | B2 * | 4/2008 | Holman ................. H02G 3/088 16/2.1 |
| 2002/0173204 | A1 | 11/2002 | Yamanashi et al. |
| 2006/0241318 | A1 | 10/2006 | MacHulla et al. |
| 2007/0169963 | A1 * | 7/2007 | Beele ........................ F16L 5/04 174/650 |
| 2008/0042536 | A1 | 2/2008 | Guzzo et al. |

FOREIGN PATENT DOCUMENTS

| | | |
|---|---|---|
| DE | 38 32 227 C1 | 11/1989 |
| DE | 41 05 117 A1 | 8/1991 |
| DE | 199 61 244 C1 | 1/2001 |
| DE | 103 46 742 A1 | 2/2005 |
| DE | 103 46 228 A1 | 4/2005 |
| EP | 0 368 445 A2 | 5/1990 |
| EP | 0 531 172 A1 | 3/1993 |
| FR | 2 636 790 A2 | 3/1990 |
| WO | 2008/024350 A2 | 2/2008 |

* cited by examiner

SEALING DEVICE FOR FEEDING THROUGH FILAMENTS

This application is a Continuation of U.S. patent application Ser. No. 14/128,205, filed 5 Mar. 2014, now U.S. Pat. No. 10,186,853, which is a National Stage Application of PCT/EP2012/061773, filed 20 Jun. 2012, which claims benefit of Ser. No. 11170622.2, filed 20 Jun. 2011 in Europe and which applications are incorporated herein by reference. To the extent appropriate, a claim of priority is made to each of the above disclosed applications.

BACKGROUND

The invention relates to an apparatus for feeding through at least one filament.

For many applications it is necessary to feed filaments through a wall of a box or a casing. The filaments may for example be optical fibers or electric cables. The filaments may also be referred to as pigtails. Filaments may comprise for example a single optical fiber or multiple optical fibers.

EP 0 531 172 B1 describes a possible feed through. Similar arrangements are also known for fixating filaments inside a casing. Such an arrangement is described for example in the documents US 2008/0042536 A1.

DE 199 61 244 CI describes a housing that has an opening provided in one wall element of the housing body for locating a carrier receiving a number of cooperating cable guides, provided with seatings between their longitudinal sides for reception of sealing elements for the cables, which are fitted between cooperating notches along the longitudinal sides of the adjacent cable guides. The cable guides are stacked and fixed to each other. Therefore it is difficult to add or remove cables after initial assembly.

DE 27 20 936 describes a sealing arrangement that uses two sealing strips, which are deformed in a plastic manner, when these sealing strips close an opening and seal cables fed through that opening in the wall.

The document EP 0 368 445 A2 describes a comb-like support structure for optical cords having slots of uniform width having resiliently-compressible walls which grip frictionally the cords. Intermediate portions of the cords are simply pushed into corresponding slots from one end.

SUMMARY

It is an object of the present invention to provide an improved apparatus for feeding through at least one filament.

According to the invention, a sealing device for feeding through at least one filament is provided, the sealing device comprising a one-piece housing, said housing comprises a seal block compartment being laterally bounded, wherein the seal block compartment comprises an open top face and at least four slots, wherein each slot has an open end at the open top face of the sealblock compartment, wherein each one of the slot corresponds to another one of the slots, wherein slots corresponding to each other are aligned and located on opposite sides of the bounded seal block compartment and a one-piece seal block being arranged in the seal block compartment, wherein the seal block comprises slits being open sided towards the open sided top face of the seal block compartment, each slit being aligned with two slots corresponding to each other, so that one can feed through a filament by sliding an intermediate part of the filament from the open end into the slit and the corresponding slots in the seal block compartment.

According to the invention one embodiment of a sealing device for feeding through at least one filament is provided, the sealing device comprising a housing, said housing comprises a seal block compartment being laterally bounded by a front wall and a back wall being spaced apart and opposite to each other, and side walls being spaced apart and opposite to each other, said side walls joining the front wall and the back wall, wherein the seal block compartment has an open top face, wherein the front wall and the back wall each comprise several slots having an open end at the open top face of the seal block compartment, wherein each of the slots in the front wall corresponds to and is aligned with a slot in the back wall, and a seal block being arranged in the seal block compartment, wherein the seal block comprises slits being open sided towards the open sided top of the seal block compartment, each slit being aligned with one slots in the front wall and one slot in the back wall, these two slots are corresponding to each other, so that one can feed through a filament by sliding it from the open end into the slit and the corresponding slots of the front wall and back wall.

The advantage of such sealing devices is its compactness. It is easy to add further filament to the seal block by just pushing an intermediate part of a filament into one of the slits of the sealing block. Also removal of one filament, several filaments or all filaments is possible by just pulling them out of their respective slit of the seal block. In case of need even the seal block which might be deteriorated due to aging can be replaced easily. Also assembly of the sealing device is easy. One just has to insert the seal block via the open top face of the sealing block compartment. One only has to caution to insert the seal block with its bottom part, not having any slits, facing in the direction of the bottom of the sealing block compartment. I.e. the open end of the slits has to face in the same direction as the open ends of the slots in the front wall and the back wall of the seal block compartment. An installer does not need any extra sealing material for each filament to be fed through. The slits and slots are designed to receive several filaments in a stacked fashion each. The term filament is used here for any type of cable, especially optical cables comprising one single fiber or multiple optical fibers. A filament can also be a ribbon of optical fibers. The filament can be a fiber without cover elements, as well as a fiber with a cover element. A cover element can be a jacket or any other supporting or protecting element like KEVLAR® fibers, a sleeve, a tube or the like.

In a preferred embodiment the several slots in the front wall and the back wall are aligned in parallel. This way many slots can be fitted in the front and the back wall. Obviously the slits in the sealing block are also oriented parallel to each other in an embodiment with parallel slots.

Preferably the slots are oriented perpendicular to the top face of the sealing block compartment. In one embodiment the slots extend in the front wall and back wall from the open top in a direction towards a bottom of the seal block compartment. Preferably there will be an offset between the bottom end of the slots and an inner bottom face of the seal block compartment.

The slots are preferably U-shaped. The width of different slots in the front wall may be different. In this way filaments of different diameter may be fed through different slots.

Further in some embodiments at least for one set of slot corresponding to each other in the front wall and the back wall the width of the slots differs. I.e. the width of the slot in the front wall is smaller than the width of the slot in the back wall or the other way around. Usually the width of the slot that is facing to the outside of a box or casing the seal device is incorporated or inserted in is chosen as small as possible to minimize exposure of the seal block to environmental influences. Usually the front wall is chosen to be the outside wall. The wall facing inside is providing slots having a larger width. By this weight and material needed to manufacture the sealing device and the seal block compartment can be reduced.

In a preferred embodiment the sealing block is made of a resilient-compressible material. It has to conform to small filaments to achieve a good sealing performance. On the other hand friction when acting on the filament during insertion into the slit has to be limited especially when the filament is an optical fiber, for example a pigtail. Otherwise the fiber might be damaged when an intermediate section of the fiber is pushed into the slit of the sealing block.

Very good sealing effects as well as acceptable friction coefficients have been found for closed cell foams. Therefore in a preferred embodiment the seal block is a foam block.

To ease insertion of the filaments into a slit the opposing surfaces at slit are tapered at the open end of the slit, i.e. at the top of the seal block.

To achieve the desired sealing the opposing surfaces of each slit are in contact with each other to provide a sealing of the corresponding slot against moisture, dust and other environmental influences.

In a preferred embodiment the seal block provides a sealing of IP54 or better having none, one, or more filaments inserted into each one of said slits up to a predefined maximum number of filaments per slit. The number of filaments per slit is limited due to the fact that the sealing block material has to enclose a filament to achieve sealing. Thus there should remain a certain distance between adjacent filaments to be filled by the sealing material of the seal block. Slits can easily accept 25 or more filaments.

It is advantageous to manufacture the sealing device as a separate component rather than as an integral part of a wall of a box or casing, though which filaments are to be fed. In a preferred embodiment the housing comprises grooves and/or bars oriented in parallel to the slots to mate with bars or grooves, respectively, provided adjacent to a clearing in a wall of a box or casing to enable a slid-in connection of the sealing device into that wall.

Also for integration purposes it is preferred that the front wall of the sealing compartment is part of the front wall of the housing of the sealing device.

To reduce weight and material the housing of the sealing device is preferably at least partly hallow. The back wall is open or missing in large areas. This enables easy production of the sealing device using injection molding or injection compression molding.

In some embodiments the seal block is chosen to have a width perpendicular to the slit directions that is greater than the distance between the side walls of the seal block compartment. By inserting the seal block in to the seal block compartment it is compressed in the direction perpendicular to the slit directions. This ensures that the opposing surfaces of the slits are pressed into contact.

Preferably the seal block fills the complete lateral cross section of the seal block compartment in each plane perpendicular to the front wall. Thus a front face of the seal block abuts the inner surface of the seal block compartment, the back face of the seal block abuts the inner surface of the back wall and the side faces abut the inner surfaces of the side walls.

In one embodiment the hosing is provided with at least one bore. The bore can be used together with a tap hole in the box or casing to fix the sealing device in said box or casing after insertion.

BRIEF DESCRIPTION OF THE DRAWINGS

The invention will now be explained in greater detail with reference to the Figures in which

FIG. 6 shows a cut-out of a box a sealing device is inserted in.

DETAILED DESCRIPTION

Figure 1:
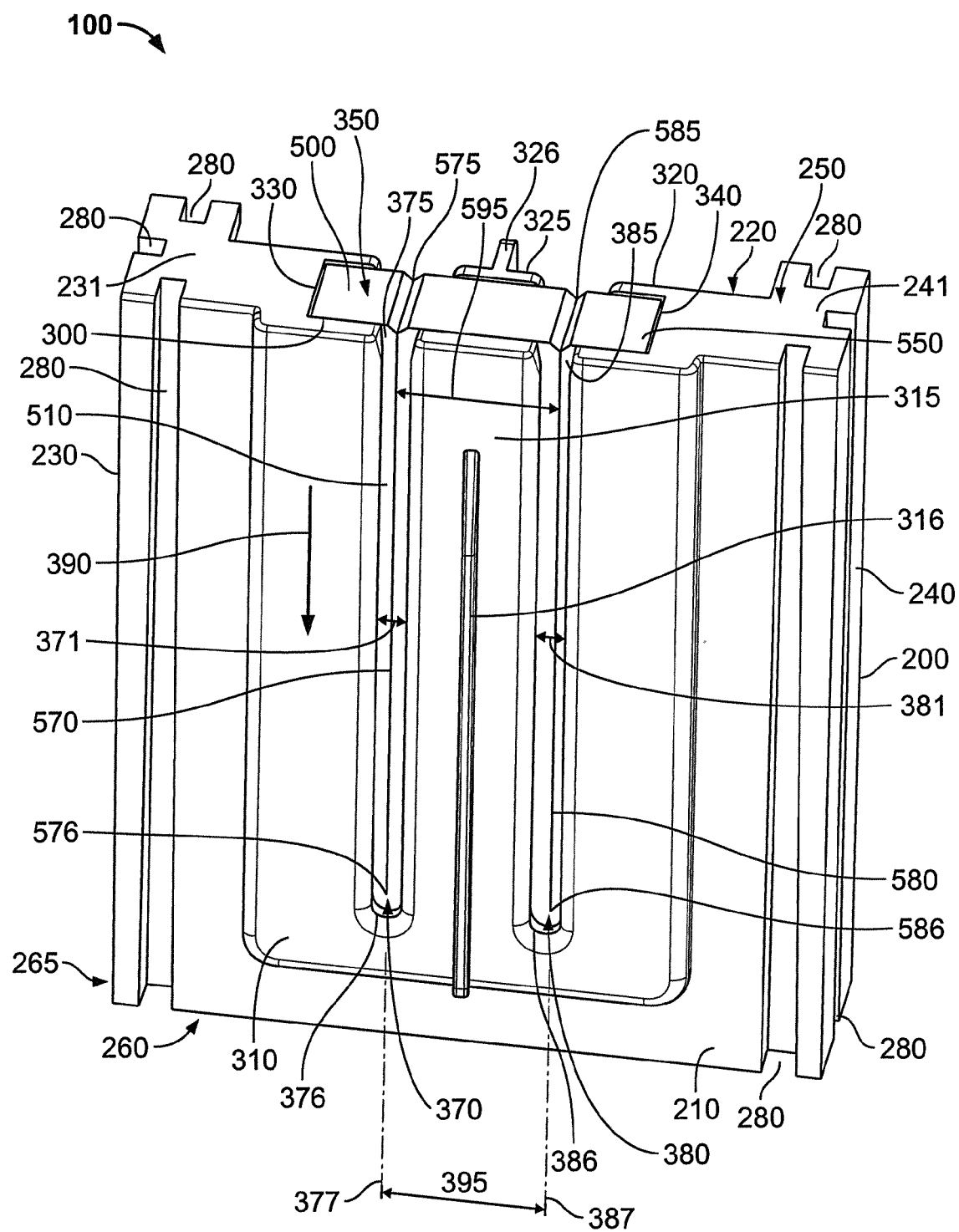
FIG. 1 shows a perspective front view of a sealing device according to a first embodiment.

FIG. 1 shows a perspective front view of a sealing device 100. The sealing device comprises a housing 200. The housing has a front face 210, a rear face 220, side faces 230, 240, a top face 250, and a bottom face 260.

The housing 200 comprises a seal block compartment 300. The seal block compartment is laterally bounded by a front wall 310, which is spaced apart from a back wall 320. The back wall is opposite of the front wall 310. In the preferred embodiment the front wall is part of the front face 210 of the housing 200. The seal block compartment 300 is laterally bounded further by side walls 330 and 340. The side walls 330, 340 are opposite to each other and spaced apart. The side walls 330 and 340 join the front wall 310 and the back 320 wall at their respective edges. Seal block compartment 300 is provided with a bottom wall (not shown). The seal block is open at the top face 350.

The front wall 310 comprises two slots 370, 380. These are oriented in parallel to each other. They both comprise a U-Shape and have an open end 375, 385, respectively. The slots 370, 380 extend from the top of the seal block compartment 350 in a direction towards its bottom. Usually there is an offset between the inner surface of the bottom wall and the closed end 376, 386 of the slots 370, 380. The slots widths 371, 381 of the slots 370, 380 are kept as small as possible but wide enough to feed through a filament, which might be an optical fiber, such as a pig tail.

The back wall 320 comprises slots 470 and 480 corresponding to the slots 370, 380 of the front wall, respectively. As can be seen from the rear view shown on FIG. 2 the slots 470, 480 in the back wall also comprise an open end 475, 485 and a closed end 476, 486. The open ends coincide with the open face 350 of the seal block compartment 300.

The slots 470, 480 in the back wall 320 are aligned in parallel to each other. Further there exists a one-to-one correspondence between one of the slots 370, 380 in the front wall and one of the slots 470, 480 in the back wall. In the embodiment shown slot 370 in the front wall 310 corresponds to slot 470 in the back wall and slot 380 corresponds with slot 480. Slots corresponding to each other are aligned to each other. The widths 472, 482 of the slots 470, 480 are larger than the widths 371, 381 of the corresponding slots 370, 380 in the front wall.

The sections 315 of the front wall 310 and the section 325 of the back wall 320 are stabilized by fins 316 and 326, respectively.

Figure 2:
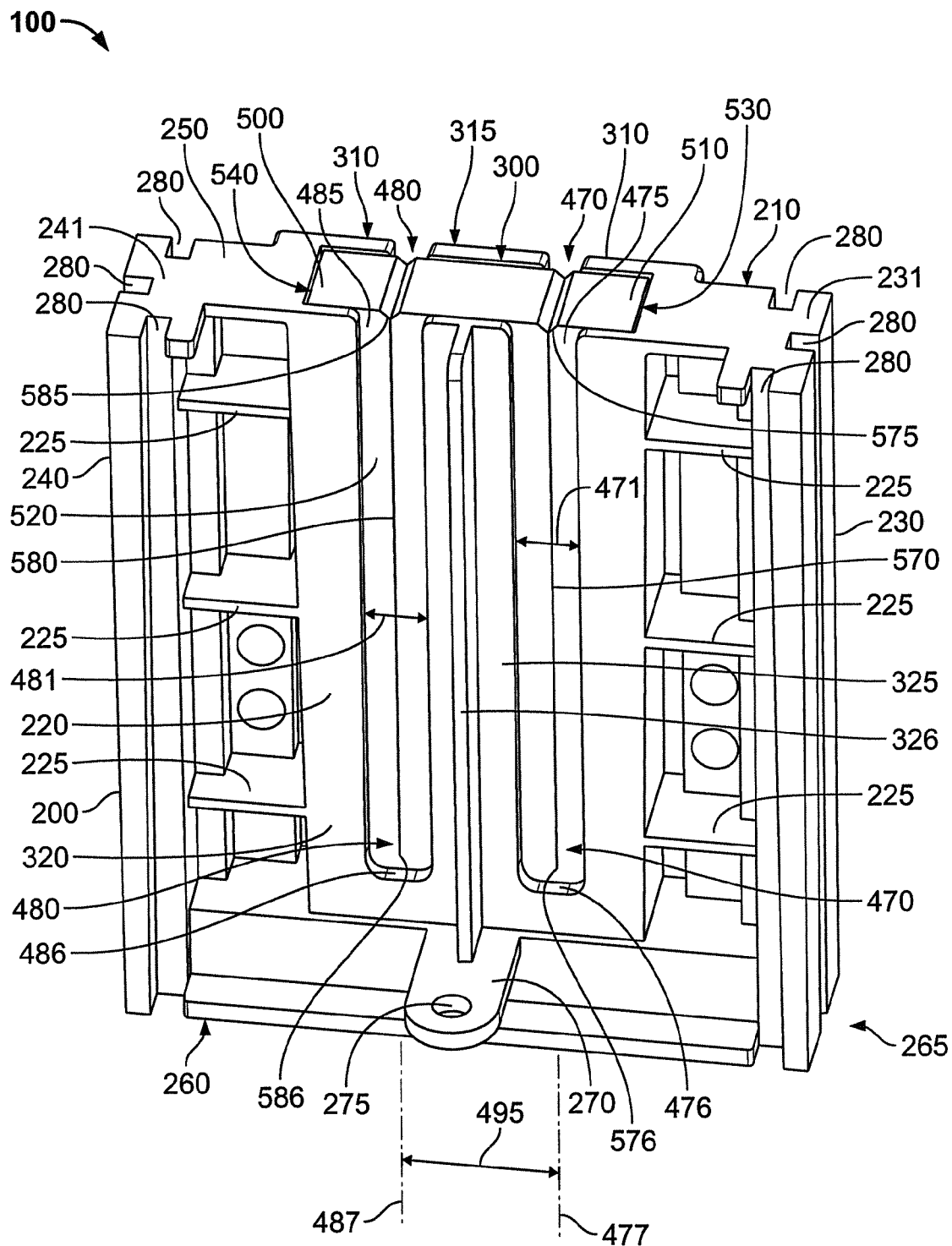
FIG. 2 shows a perspective rear view of the sealing device according to the first embodiment.

FIG. 2 shows that the housing is partly hallow from the back face to reduce weight and the amount of material needed for manufacturing it. A hallow design also eases the manufacturing process. Strut members 225 needed for stability reasons are provided between the sealing block compartment side walls 330, 340 and the side elements 231, 241 of the housing 200.

Figure 5:
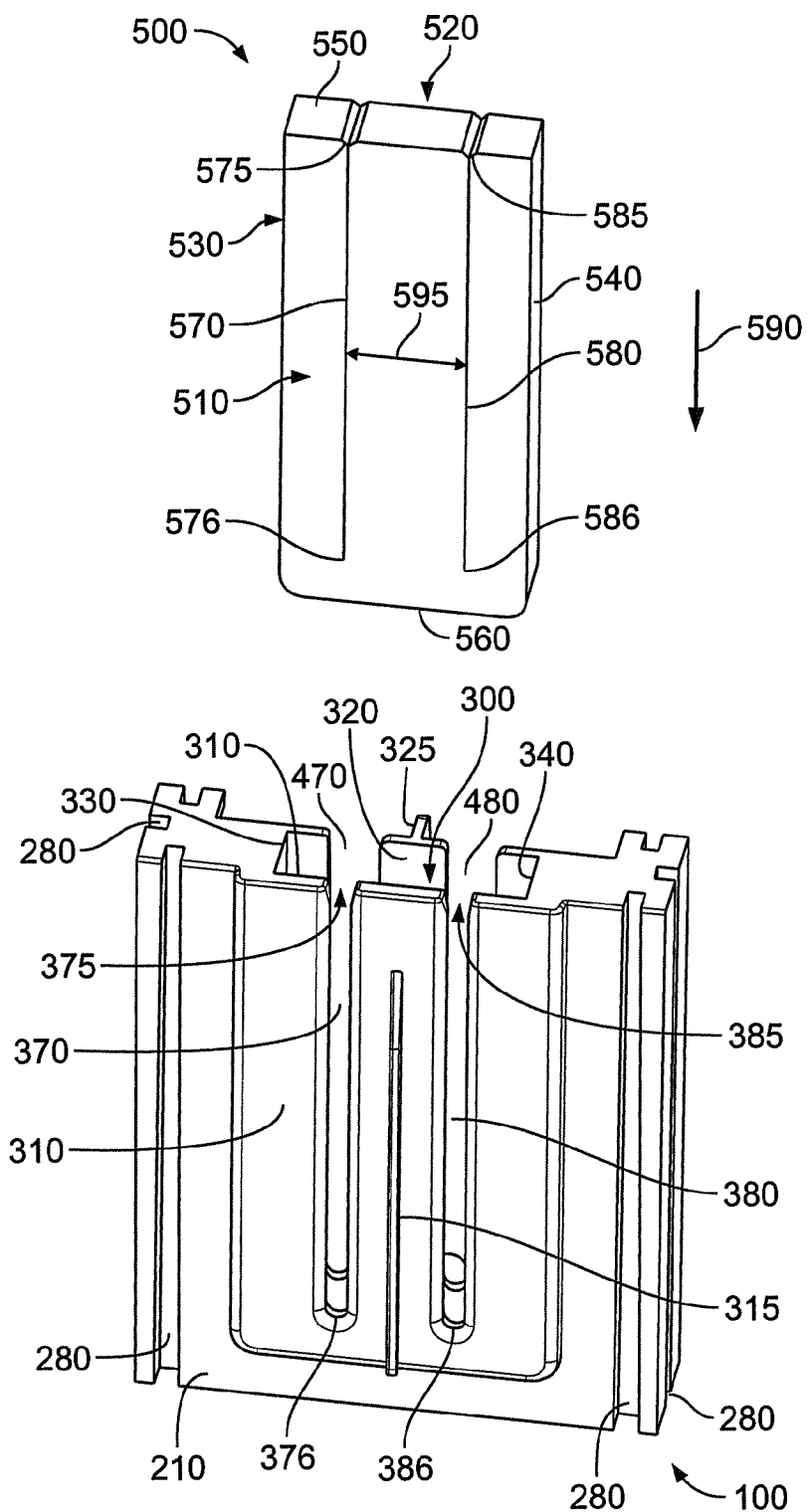
FIG. 5 shows a perspective explosion of the sealing device according to the first embodiment.

A seal block 500, which can be seen best in the explosion view of FIG. 5 in positioned inside the sealing block compartment 300. The sealing block 500 has a front face 510, a rear face 520, side faces 530, 540, a top face 550, and a bottom face 560. The sealing block is inserted into the sealing block compartment 300 such that the bottom face 560 faces the bottom wall; the front face faces the inner surface of the front wall 310 and so on.

The seal block 500 is made of a resilient-compressible material. Preferably the seal block material is a closed cell foam. For example foams made of Ethylene-Propylene-Diene-Monomers (EPDM) are suitable. For example foam of the company ERIKS nv, Alkmaar, the Netherlands sold under the trade name 559 PI 80 can be used to form a sealing block. The density is $180\pm20$ kg/m$^3$. The cell sizes of the closed cell vary preferably between 0.2 to 0.5 mm. Other materials providing sealing as well as limited friction can be used to create the seal block as well.

The sealing block 500 is a foam block having cut slits 570, 580. The slits 570, 580 extend along a slit direction 590 from the top face 510 in the direction towards the bottom face 560. There remains a bottom section 565 of the sealing block which is free of the slits. The slits are oriented in parallel to each other. The spacing 595 between the slits 570, 580 on the front face is identical to the spacing 395 of the slots 370, 380 on in the front wall 310 and the spacing 495 on the back wall 320 of the sealing block compartment 300. The spacing of the slots is always the spacing between the center lines 377, 387, 477 487.

When the sealing block 500 is inserted into the sealing block compartment 300 the slits 570 and 580 are aligned with the respective slot 370, 470 and 380, 480.

Figure 4:
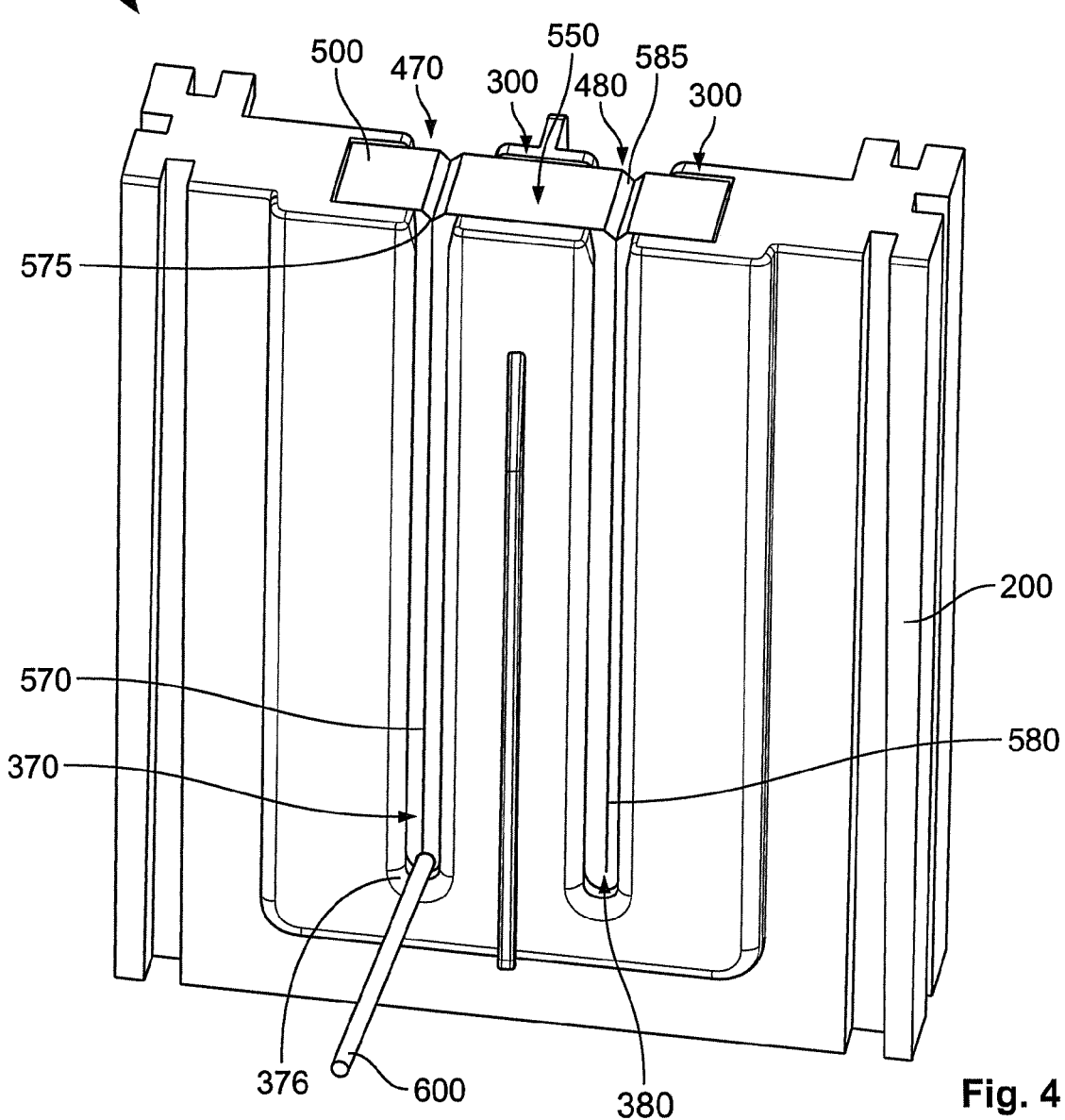
FIG. 4 shows a perspective front view of the sealing device according to a first embodiment depicting the feed through of a filament.

It is thus possible to insert filaments 600 into the sealing device 100 by pushing the filament 600 into one of the slits 570, 580 from the open end towards the closed end 576 586. By this the filament is also inserted into the corresponding slots 370, 470 or 380, 480. In FIG. 4 a filament 600 is inserted into the slit 570 and the corresponding slots 370, 470. Further filaments can be stacked in the same slit for feed through purposes. The intermediate part of the filament 600 fed through the sealing device 100 is oriented perpendicular to the front wall 310.

The opposing surfaces of the slits 470, 480 are in contact to achieve sealing. Sealing better than IP54 can be reached. To ease the insertion of filaments the surfaces are slightly tapered at the top face 550, as can be in FIGS. 1 to 5.

Figure 3:
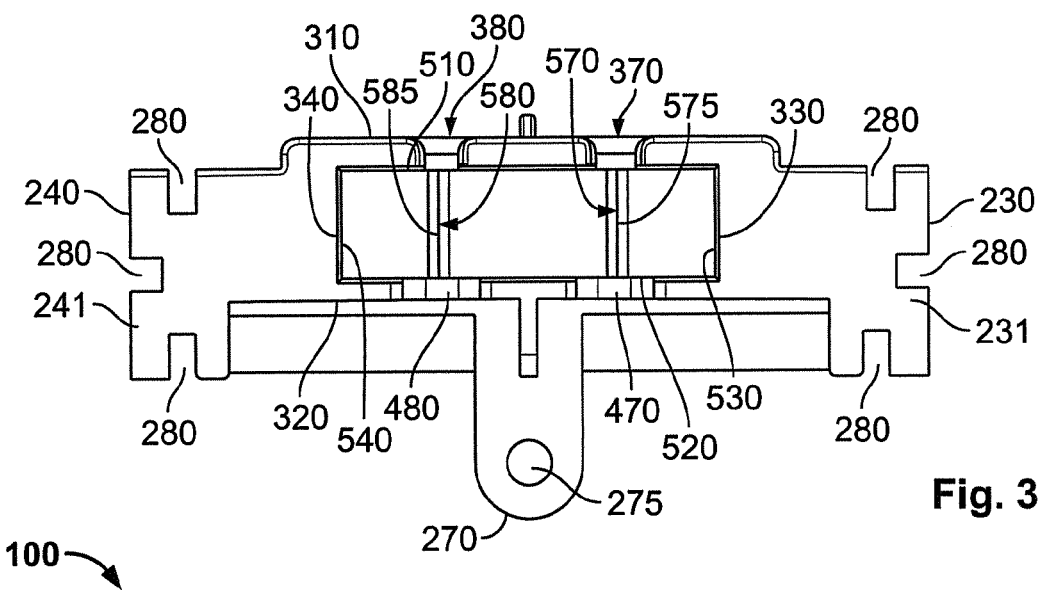
FIG. 3 shows a top view of the sealing device according to the first embodiment.

FIG. 3 shows the top view of the sealing device 100.

Figure 6:
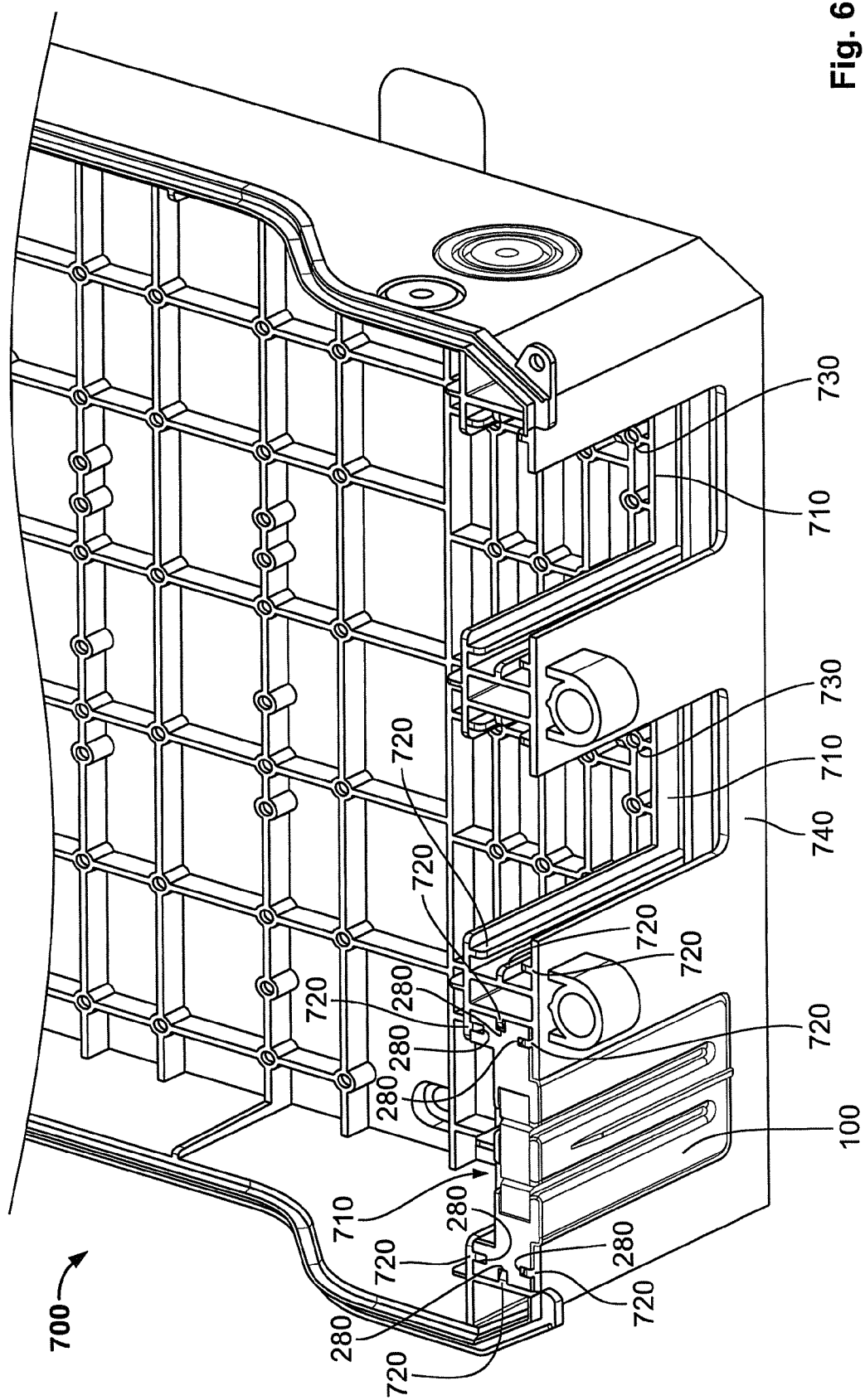

As can be inferred from FIGS. 2 and 3, a bottom section 265 of the housing 200 comprises a nose protruding perpendicular to the rear wall of the seal block compartment 300. This nose 270 comprises a bore 275 this can be used to fix the sealing device 100 after it was positioned in a clearance 710 provided in a wall 740 of a box 700. Such a box is shown in FIG. 6. The box 700 is provided with tab holes 730 for this purpose of fixing.

To ensure an easy and reliable positioning of the sealing device in one of the clearances 710 the housing 200 provides a number of grooves 280 extending from the top face 210 to the bottom face 260. The box is provided with bars 720 for mating with the grooves 280. Thus the sealing device can be inserted in a slide in fashion and fixed thereafter. In FIG. 6 one sealing device of is inserted into the wall 740 of the box 700.

The embodiment shown in FIGS. 1 to 6 comprises two slots and correspondingly two slits. In other embodiments there can be more slots and slits in a sealing device. One slit can occupy several filaments. The maximum number depends on the slit length measured along the slit direction.

PART LIST 100 sealing device
200 housing
210 front face/wall
220 rear face
225 strut members
230 side face
231 side element
240 side face
241 side element
250 top face
260 bottom face
265 bottom section
270 nose
275 bore
280 grooves
300 seal block compartment
310 front wall
315 finger like section
316 fin
320 back wall
325 finger like section
326 fin
330 side wall
340 sidewall
350 top
370 slot
371 slot width
375 open end
376 closed end
377 center line
380 slot
381 slot width
385 open end
386 closed end
387 center line
390 slot direction
395 spacing between slots
470 slot
471 slot width
475 open end
476 closed end
477 center line
480 slot
481 slot width
485 open end
486 closed end
487 center line
495 spacing between slots
500 sealing block 510 front face
520 rear face
530 side face
540 sideface
550 top face
560 bottom face
570 slit
575 open end
576 closed end
580 slit
585 open end
586 closed end
590 slit direction
595 slit distance
600 filament
700 (distribution) box
710 clearances
720 bars
730 tap hole
740 wall

The invention claimed is:

1. A sealing device for feeding through at least one filament, the sealing device comprising:
a one-piece housing, the one-piece housing comprising a seal block compartment having an open top face and being laterally bounded by a front face and an opposing back face and by first side face and an opposing second side face, wherein the front face includes a slot aligned with a corresponding slot on the back face, wherein each of the front face, back face, first side face and second side face include at least one alignment groove, wherein at least one of the front and back faces includes both a nose extending perpendicularly to the at least one of the front and back faces and a stabilizing fin that extends between the nose and the open top face; and
a one-piece seal block within the seal block compartment, wherein the seal block includes a filament-receiving slit being open sided towards the open sided top face of the seal block compartment, the filament-receiving slit defined by a pair of opposing surfaces and being aligned with the slot on the front face and the corresponding slot on the back face.

2. The sealing device of claim 1, wherein each of the front and back face each include at least two alignment grooves.

3. The sealing device of claim 1, wherein the front face of the one-piece housing includes a plurality of slots and the back face includes a corresponding plurality of slots, wherein the one-piece sealing block includes a corresponding number of slits that align with respective slots of the front and back face, wherein the one-piece seal block is continuous intermediate the plurality of filament-receiving slits, is continuous between the first side wall and the filament-receiving slit closest to the first side wall, and is continuous between the second side wall and the filament-receiving slit closest to the second side wall.

4. The sealing device of claim 1, wherein the front and back face each include at least two slots and wherein the at least two slots in the front face and the back face are aligned in parallel.

5. The sealing device of claim 1, wherein the seal block is formed of a conformingly sealable material.

6. The sealing device of claim 5, wherein the conformingly sealable material of the one-piece seal block comprises an ethylene-propylene-diene-monomer (EPDM).

7. The sealing device of claim 5, wherein the conformingly sealable material of the one-piece seal block has a density of 180±20 kg/m$^3$.

8. The sealing device of claim 5, wherein the conformingly sealable material of the one-piece seal block includes a plurality of closed cells wherein each of the closed cells has a cell size that varies between 0.2 to 0.5 mm.

9. The sealing device of claim 1, wherein the one-piece housing additionally comprises a bottom wall of the seal block compartment.

10. The sealing device of claim 1, wherein the front and back face each include at least two slots and wherein the at least two slots on the front face have different widths and the corresponding slots on the back face have corresponding widths.

11. The sealing device of claim 1, wherein the alignment grooves are oriented parallel to the slots.

12. The sealing device of claim 1, wherein the seal block is compressed by the first side face and the opposing second side face of the seal block compartment.

13. The sealing device of claim 1, wherein the nose and the stabilizing fin are centrally positioned on the at least one of the front and back faces intermediate the first and second side faces.

14. The sealing device of claim 1, wherein the nose includes a position-fixing bore.

15. A system comprising,
a box having an housing-receiving slot;
a one-piece housing within the housing-receiving slot of the box, the one-piece housing comprising a seal block compartment having an open top face and being laterally bounded by a front face and an opposing back face and by first side face and an opposing second side face, wherein the front face includes a slot aligned with a corresponding slot on the back face, wherein each of the front face, back face, first side face and second side face include at least one alignment groove and wherein each of the alignment grooves interfaces with a mating bar within the housing-receiving slot, wherein at least one of the front and back faces includes both a nose extending perpendicularly to the at least one of the front and back faces and a stabilizing fin that extends between the nose and the open top face; and
a one-piece seal block within the seal block compartment, wherein the seal block includes a filament-receiving slit being open sided towards the open sided top face of the seal block compartment, the filament-receiving slit defined by a pair of opposing surfaces and being aligned with the slot on the front face and the corresponding slot on the back face.

16. The system of claim 15, wherein each of the front and back face each include at least two alignment grooves.

17. The system of claim 15, wherein the one-piece seal block is removably receivable in the one-piece housing and wherein the one-piece housing is removably receivable in the housing-receiving slot of the box.

18. The system of claim 15, wherein the seal block is formed of a conformingly sealable material.

19. The system of claim 15, wherein the box includes a plurality of housing-receiving slots.

20. A sealing device for feeding through at least one filament, the sealing device comprising:
a one-piece housing, the one-piece housing comprising a seal block compartment having an open top face and being laterally bounded by a front face and an opposing back face and by first side face and an opposing second side face, wherein the front face includes a plurality of slots, each slot of the front face being aligned with a corresponding slot on the back face, wherein each of the front face, back face, first side face and second side face include at least one alignment groove, wherein at least one of the front and back faces includes both a nose extending perpendicularly to the at least one of the front and back faces and a stabilizing fin that extends between the nose and the open top face; and
a one-piece seal block within the seal block compartment, wherein the seal block includes a plurality of filament-receiving slits being open sided towards the open sided top face of the seal block compartment, the plurality of filament-receiving slits defined by a pair of opposing surfaces, wherein each of the plurality of filament-receiving slits is aligned with one of the plurality of slots on the front face and the corresponding slot on the back face.

* * * * *